E. W. CLARK, DEC'D.

SECURITY TRUST & SAVINGS BANK, EXECUTOR.

ARTICLE OF MANUFACTURE.

APPLICATION FILED DEC. 16, 1921.

Reissued June 27, 1922. 15,393.

INVENTOR.
Edward W. Clark, deceased,
Security Trust & Savings Bank,
Executor,
By J. Walter L. Mead
Attorney.

UNITED STATES PATENT OFFICE.

EDWARD W. CLARK, DECEASED, LATE OF LOS ANGELES, CALIFORNIA, BY SECURITY TRUST & SAVINGS BANK, EXECUTOR, OF LOS ANGELES, CALIFORNIA, A CORPORATION OF CALIFORNIA; SAID CLARK ASSIGNOR OF ONE-FOURTH TO STANLEY S. TURNER, ONE-FOURTH TO SUSIE M. CLARK, AND ONE-FOURTH TO VIOLET E. TURNER, ALL OF LOS ANGELES, CALIFORNIA.

ARTICLE OF MANUFACTURE.

15,393. Specification of Reissued Letters Patent. Reissued June 27, 1922.

Original No. 1,358,364, dated November 9, 1920, Serial No. 316,262, filed August 5, 1919. Application for reissue filed December 16, 1921. Serial No. 522,917.

*To all whom it may concern:*

Be it known that EDWARD W. CLARK, deceased, late a citizen of the United States, residing at Los Angeles, in the county of Los Angeles and State of California, has invented new and useful Improvements in Articles of Manufacture, of which the following is a specification.

My invention relates to an article of manufacture generally and particularly to piston for internal combustion engines as an article of manufacture and methods for manufacturing the same, and the main object of this invention is to provide a piston of minimum weight and maximum efficiency, formed as an integral structure of cast metal preferably of cast iron and internally reinforced so as to render the head incapable of breakage in ordinary usage due to the shock of the gas explosions in the cylinder.

It has been demonstrated in practice that in internal combustion engines principally, the stroke being comparatively short, a considerable amount of vibration is set up by the operations of the pistons, and it is an object of this invention to eliminate as much as possible of such vibration by providing a light weight piston of the character mentioned, thus considerably lessening the energy expended by the engine at each revolution of the crank shaft by decreasing the weight of the pistons which are lifted thereby. This advantage is more apparent in four cylinder engines than in six cylinder engines, as in the latter the stroke is longer and the vibration is normally less.

Heretofore in pistons of ordinary types, a plentiful supply of metal has been usually provided in the head and in the walls where the greatest strain is had, and the benefits of light weight have been sacrificed for long life and strength. I have discovered by experiment and practice that an integral piston may be provided having a minimum weight and yet with a substantial reduction in the thickness of the metal around the skirt and in the head, by the provision of scientifically arranged and proportioned ribs on the inner side of the head and skirt, and serving to connect these portions in such a manner that the successive impacts from the gas explosions will be resisted effectively by the head and the strain distributed so that the life of the piston will not be ordinarily effected. The arrangement of the ribs on the interior of the piston is such that the upper portions of said ribs are radially disposed on the inner side of the head and extend outwardly from the central portion of the head to the skirt, and have lower and downwardly extended portions longitudinally disposed on the inner periphery of the skirt. The spacing of the ribs on said skirt and said heads is uniform and the distance between the ribs on the skirt, in order to obtain the best results and to properly reinforce the ribs, is usually and preferably less than the radius of the skirt. In other words, in a very small piston it might be found satisfactory to use six members, in which case the spacing of the ribs on the skirt would approximate the radius of the skirt, but in practice I have found that the number of ribs should exceed six, and the greater the number of ribs, the greater the reinforcement for the skirt and head of the piston.

Furthermore, I have found in practice that cast iron is the best metal for use in a piston of this kind, and it is therefore an object of my invention to provide an integrally ribbed cast iron piston, in which the ribs have portions radially disposed on the head, and other portions longitudinally disposed and extending substantially downwardly on the skirt, certain of said ribs intersecting and being alined with the wrist pin bosses usually provided in the skirt of the piston, so as to brace said bosses on the skirt.

It is a further object to provide said ribs of such form and character that they will serve to thoroughly brace the upper portion of the skirt which is usually of substantially greater thickness than the lower portion, in order to accommodate the ring grooves and to extend the lower portions of said ribs substantially downwardly below the ring groove portion of the skirt, thereby preventing the warping of the metal on the thinner portion of the skirt in the casting operation, and also uniformly distributing the ribs and forming the same so as to correspondingly distribute the strain incidental to use.

Other objects will appear as the description progresses.

Referring to the drawings in which I have shown one practical embodiment of my invention:

Similar characters of reference are employed in the several views of the drawing and in the specification for indicating the same and like parts.

Figure 2:
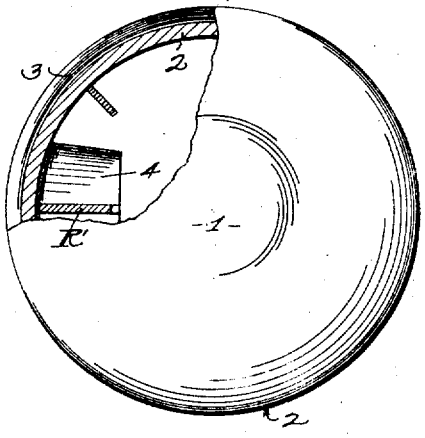
Fig. 2 is a top plan of the same, partly in section.
Figure 1:
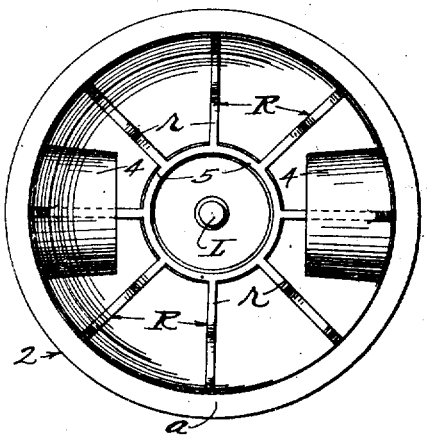
Fig. 1 is a bottom plan of my improved piston.
Figure 3:
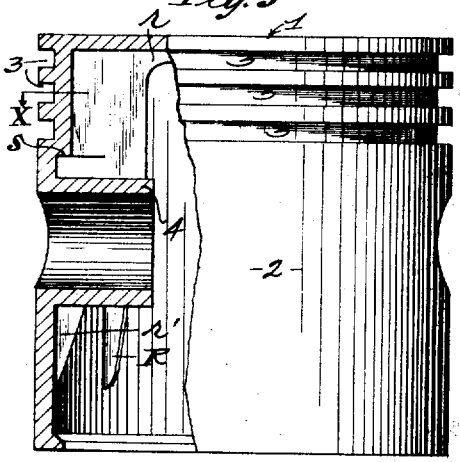
Fig. 3 is a side elevation of the same, partly in section.
Figure 4:
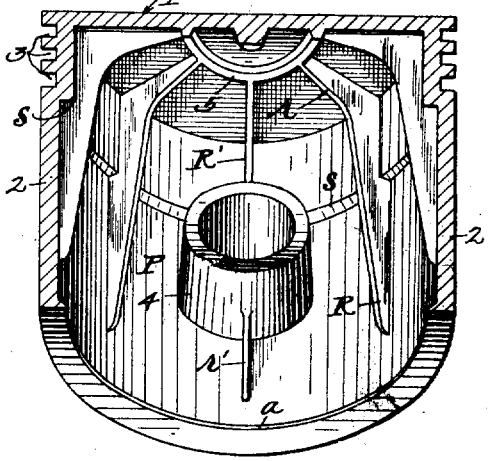
Fig. 4 is a transverse sectional view, in perspective, of the interior of the piston.

Referring now, more in detail to the drawing, my improved piston will be seen to embody the usual form of commercial piston, with the head portion 1, the wall 2, having ring grooves 3, 3, therein and wrist pin bosses 4, 4, being formed integral therewith, as usual. The casting is so formed that the thickness of the said head and wall may be as little as possible and yet be rigid enough for use, a plurality of ribs R, R, etc., six or more, being formed at regular intervals around the interior of the piston which radiate from the center and are tapered from their upper portions to their lower extremities.

A central depending lug L may be formed on the inner side of the head 1, by means of which the piston may be centered in a lathe or other finishing machine, and an annular rib 5 may be formed concentrically around said lug for affording rigidity to the head. The portions *r*, *r*, etc., of the ribs R, R, etc., stop short of the center, or may connect with the concentric rib 5, and taper radially therefrom so as to afford additional rigidity to the head. Other ribs R′, and R′ are uniformly spaced with respect to the ribs R, R, etc., and alined with the pin bosses 4, 4, and the upper portions thereof serve to brace said bosses against the head and upper portions of the skirt, while the lower portions *r*′, *r*′ thereof serve to brace said bosses against the lower portion of the skirt. At the lower end of the skirt I may provide an annular rib *a*, which serves to reinforce the bottom of the skirt.

It will be obvious that the system of ribs shown and described will distribute the strain equally over the piston skirt and head, and that the weakest point, i. e. in the center of the head, is braced by tapered ribs to the wall of the piston, thus obviating any breakage at this point due to the explosions in the cylinder. For this reason the thickness of metal at the head may be minimized, and likewise, the thickness of metal around the skirt may be substantially decreased from the ordinary pistons without decreasing the efficiency or at any point weakening the piston structure vitally. At the bottom of the lowest of the ring grooves 3, a shoulder 8 is provided which forms an annular rib for reinforcing the wall of the piston.

What I claim is:

1. As an article of manufacture, an integral structure comprising a circular head member, an annular wall member and oppositely disposed bosses extending inwardly from said wall member, an annular rib being provided on the inner side of said head member, and a plurality of radially formed ribs connecting said annular rib and said wall member and extended substantially downwardly on the interior of said wall member.

2. A piston embodying a structure having integral head and skirt portions of cast iron, said head being circular and said skirt annular, and the upper portion of said skirt adjacent said head being substantially thicker than the lower portion thereof, a plurality of ribs, integrally formed on said head and skirt and having their upper portions radially disposed on said head and gradually increasing in area from their innermost extremities outwardly and their lower portions extending downwardly in longitudinal planes on said skirt and gradually decreasing in area downwardly and connecting said head and the upper and lower portions of said skirt and spaced apart the inner extremities of the upper portions of said ribs terminating short of the center of said heads, as described.

3. A piston embodying a cast iron structure having a cylindrical skirt with oppositely formed wrist pin bosses intermediate the ends thereof, the portion of said skirt above said bosses being of substantially greater thickness than the portion therebelow, a head forming a closure for one end of said skirt of substantially uniform thickness with the lower portion of said skirt, a plurality of ribs formed on said head and skirt and spaced on said skirt at distances less than the radius of said skirt, said ribs having upper portions integral with said head and gradually increasing in area outwardly and downwardly extending lower portions longitudinally disposed on said skirt and gradually decreasing in area downwardly, for uniformly bracing said head and said skirt, certain of said ribs being alined with and intersecting said bosses, the upper portions of said ribs terminating short of the center of the head, as described.

EDWARD W. CLARK,
*Deceased.*
SECURITY TRUST & SAVINGS BANK,
*Executor,*
By BURNHAM R. CREER,
*Assistant Trust Officer.*